US005503364A

United States Patent [19]

Enomoto et al.

[11] Patent Number: 5,503,364

[45] Date of Patent: Apr. 2, 1996

[54] SOLENOID VALVE

[75] Inventors: Shigeiku Enomoto, Aichi; Toshihiko Igashira, Toyokawa; Yasuyuki Sakakibara, Nishio, all of Japan

[73] Assignee: Nippon Soken Inc., Nishio, Japan

[21] Appl. No.: 141,970

[22] Filed: Oct. 28, 1993

[30] Foreign Application Priority Data

Oct. 29, 1992 [JP] Japan .................................... 4-314011
May 21, 1993 [JP] Japan .................................... 5-119623
Jul. 21, 1993 [JP] Japan .................................... 5-179704

[51] Int. Cl.[6] ...................................................... F16K 31/06

[52] U.S. Cl. ................................ 251/129.02; 251/129.16; 239/585.3

[58] Field of Search ......................... 251/129.02, 129.15, 251/129.16, 129.08, 129.18; 239/585.1, 585.3

[56] References Cited

U.S. PATENT DOCUMENTS 4,690,373 9/1987 Linder et al. .................. 251/129.16 X

FOREIGN PATENT DOCUMENTS 61-226529 10/1986 Japan .

*Primary Examiner*—Martin P. Schwadron
*Assistant Examiner*—Kevin L. Lee
*Attorney, Agent, or Firm*—Cushman, Darby & Cushman

[57] ABSTRACT

A solenoid valve provided with a relief passage by means of which a high-pressure side and a low-pressure side communicate with each other for use, for example, in combination with a fuel injection pump, comprises a valve element capable of being advanced into and retracted from the relief passage, a first compression spring for biasing the valve element in the retracting direction, an armature attached to the rear end of the valve element, an electromagnet for attracting the armature to disconnect the high-pressure side and the low-pressure side from each other by advancing the valve element into the relief passage against the resilience of the first compression coil spring, and a second compression coil spring for holding the armature in a predetermined position close to the electromagnet against the biasing force of the first compression coil spring when the electromagnet is demagnetized.

15 Claims, 13 Drawing Sheets

SOLENOID VALVE

BACKGROUND OF THE INVENTION

1. Field of the Invention

The present invention relates to a solenoid suitable for use as an electromagnetic spill valve or the like for a fuel injection system.

2. Description of the Related Art

Recently, an electromagnetic spill valve, controlled by a computer, for timed spilling of high-pressure fuel has been proposed. The spilling operation of this known electromagnetic spill valve is controlled by an electronic method instead of a mechanical method. Referring to FIG. 13 showing an electromagnetic spill valve which closes a spill passage when the same is energized, flow passages 33 and 36 are formed in the lower portion of a valve body 31 so as to open respectively in the side surface and the bottom surface of the valve body 31 such that and the flow passages 33 and 36 communicate with each other through of a spring chamber 32. The flow passages 33 and 36 and the spring chamber 32 serve as portions of the spill passage. A needle valve 27 is supported for axial sliding movement in the upper portion of the valve body 31 with its points facing a seat surface 40 formed in the upper end of the spring chamber 32. The needle valve 27 is biased upward so as to be separated from the seat surface 40 by a compression coil spring 28 placed in the spring chamber 32. An electromagnet 25 is mounted on the valve body 31 so as to surround the upper portion of the valve body 31. The electromagnet 25 comprises a magnetic core **25*a* and an electric solenoid 25*b*. A plate-like armature 26 is fixed to the upper end of the needle valve 27. When the electric solenoid 25*b* is not energized, an air gap G is formed between the lower surface of the armature 26 and the upper end of the magnetic core 25*a*. The value of the gap G is dependent on the lift of the needle valve 27. The value of the gap G is, for example, 0.1 mm when the needle valve 27 is seated on the seat surface 40 to close the spill passage. When the electric solenoid 25*b* of the electromagnet 25 is magnetized, the armature 26 is moved downward by magnetic attraction to move the needle valve 27 downward against the resilience of the compression coil spring 28. When the needle valve 27 is seated on the seat surface 40, the flow passages 33 and 36** are disconnected from each other.

An engine for a vehicle, for example, requires a fuel injection system capable of injecting high-pressure fuel at a high rate so that of an exhaust gas discharged contains less harmful gases. The consequently, the lift of the needle valve of an electromagnetic spill valve of such a construction must be at least 0.3 mm to provide an opening sufficiently large. However, the value of the air gap G of the electromagnetic spill valve increases when the lift of the needle valve is increased. Since the magnetic attraction of the electromagnet is substantially inversely proportional to the square of the value of the air gap, the maximum lift of the needle valve must be limited to about 0.2 mm, which is contradictory to preferred conditions.

SUMMARY OF THE INVENTION

Accordingly, it is an object of the present invention to provide a solenoid valve having an comparatively small electrode magnet and capable of cutting high-pressure fuel suddenly.

In one aspect of the present invention, a solenoid valve provided with a relief passage for discharging part or all of fluid pressurized by a fluid pressurizing means into a low-pressure side, comprising: a relief valve element for opening and closing the relief passage, an electromagnet, an armature to be attracted toward the electromagnet by magnetic force generated by the electromagnet to move the valve element so that the relief passage is closed, a first biasing means for biasing the valve element away from the relief passage to open the relief passage when the electromagnet is not magnetized, and a second biasing means for biasing the the armature so that the armature is positioned in a predetermined range near the electromagnet when the pressure of the fluid prevailing within the relief passage biasing the valve element in an opening direction is not higher than a predetermined level.

When the pressure of the fluid prevailing within the relief passage drops to or below the predetermined level while the relief passage is open, the second biasing means positions the armature in the predetermined range relative to the electromagnet. Therefore, the armature can be attracted toward the electromagnet to close the relief passage with the valve element even if the electromagnet has a comparatively small capacity.

When the electromagnet is demagnetized, the first biasing means moves the valve element in the opening direction. The movement of the valve element in the opening direction is assisted by the pressure of the fluid prevailing within the relief passage if the pressure of the same is comparatively high, so that the armature is moved outside the predetermined range near the electromagnet against the resilience of the second biasing means to fully open the relief passage. Consequently, the high-pressure fluid is discharged quickly through the relief passage. Thus, when this solenoid valve is used as a spill valve, sudden cutting of fuel can be achieved.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

First Embodiment

Figure 1:
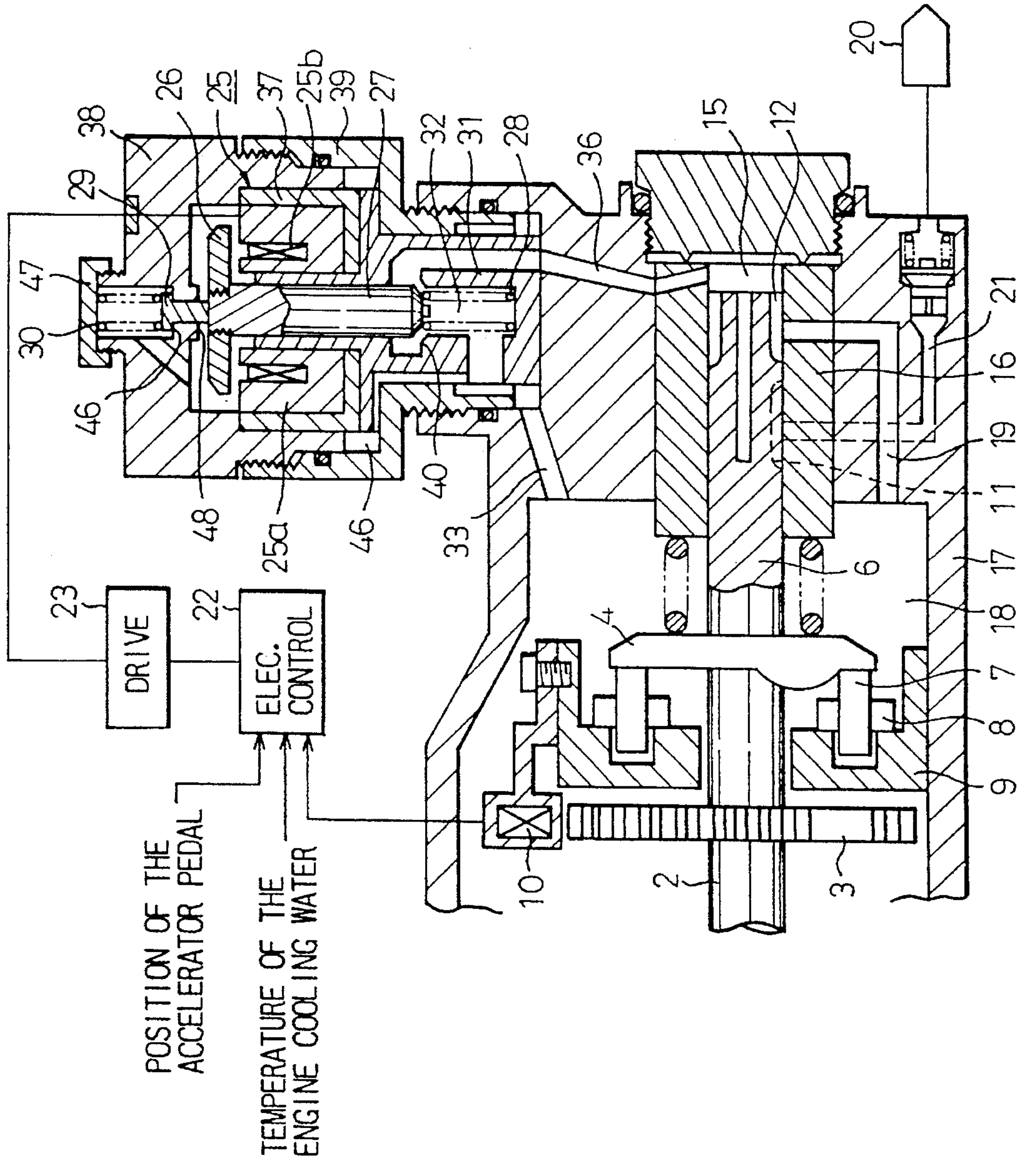
FIG. 1 is a sectional view of a fuel injection pump incorporating a solenoid valve of the present invention as a spill valve.

Referring to FIG. 1 showing a fuel injection pump incorporating a solenoid valve in a first embodiment according to the present invention as a spill valve, the fuel injection pump has a pump unit having a casing 17, a drive shaft 2 disposed within and supported for rotation on the casing 17, and a face cam 4 connected to the drive shaft 2 by a known coupling and having a cam surface. The face cam 4 is biased by a spring toward rollers 7 supported on a roller support ring 9 so that the cam surface is kept in contact with the rollers 7. When the drive shaft 2 rotates, the face cam 4 reciprocates periodically along the axis of the drive shaft 2, namely, in horizontal directions as viewed in FIG. 1. A plunger 6 is slidably fitted in a cylinder 16 so as to form an expandable pressure chamber 15 in the cylinder 16. The plunger 6 reciprocates axially together with the face cam 4. When the plunger 6 is advanced, toward the bottom of the cylinder 16, fuel filling the pressure chamber 15 is pressurized and the pressurized fuel flows through a distribution port 11 and a distribution passage 21 into an injection valve 20. When the plunger 6 is retracted, away from the bottom of the cylinder 16, the fuel contained in a low-pressure chamber 18 is sucked through a suction passage 19 and a suction groove 12 into the pressure chamber 15.

The pressure chamber 15 communicates with a flow passage formed in the valve body 31 of the solenoid valve mounted on the top face of the casing 17 and connected to a spring chamber 32 formed in the valve body 31 by means of a high-pressure passage 36 formed through the casing 17. A low-pressure passage 33 is formed in the valve body 31. The low-pressure passage 33 has one end connected to the spring chamber 32 and the other end opening into the low-pressure chamber 18. A seat surface 40 is formed at the upper end of the spring chamber 32, and a needle valve 27 is disposed coaxially with the seat surface 40 so as to be seated closely on the seat surface 40. A cylindrical valve housing 39 housing the valve body 31 is fixedly screwed on the upper end of the casing 17 with screws, and an upper housing 38 is fixedly screwed on the open upper end of the housing 39 to close the open upper end.

An electronic controller 22 receives a cylinder discriminating signal and an engine speed signal from a pickup 10 capable of detecting individual teeth formed on a signal roller 3 mounted on the drive shaft 2. The electronic pump controller 22 also receives signals representing the position of the accelerator pedal, the temperature of engine cooling water and such. The electronic controller 22 determines an optimum fuel injection timing and an appropriate amount of fuel to be forced into the combustion chamber in each fuel injection cycle on the basis of the input signals, and controls a driving circuit 23 for driving the coil **25*b* of an electromagnet 25** included in the solenoid valve.

Figure 2:
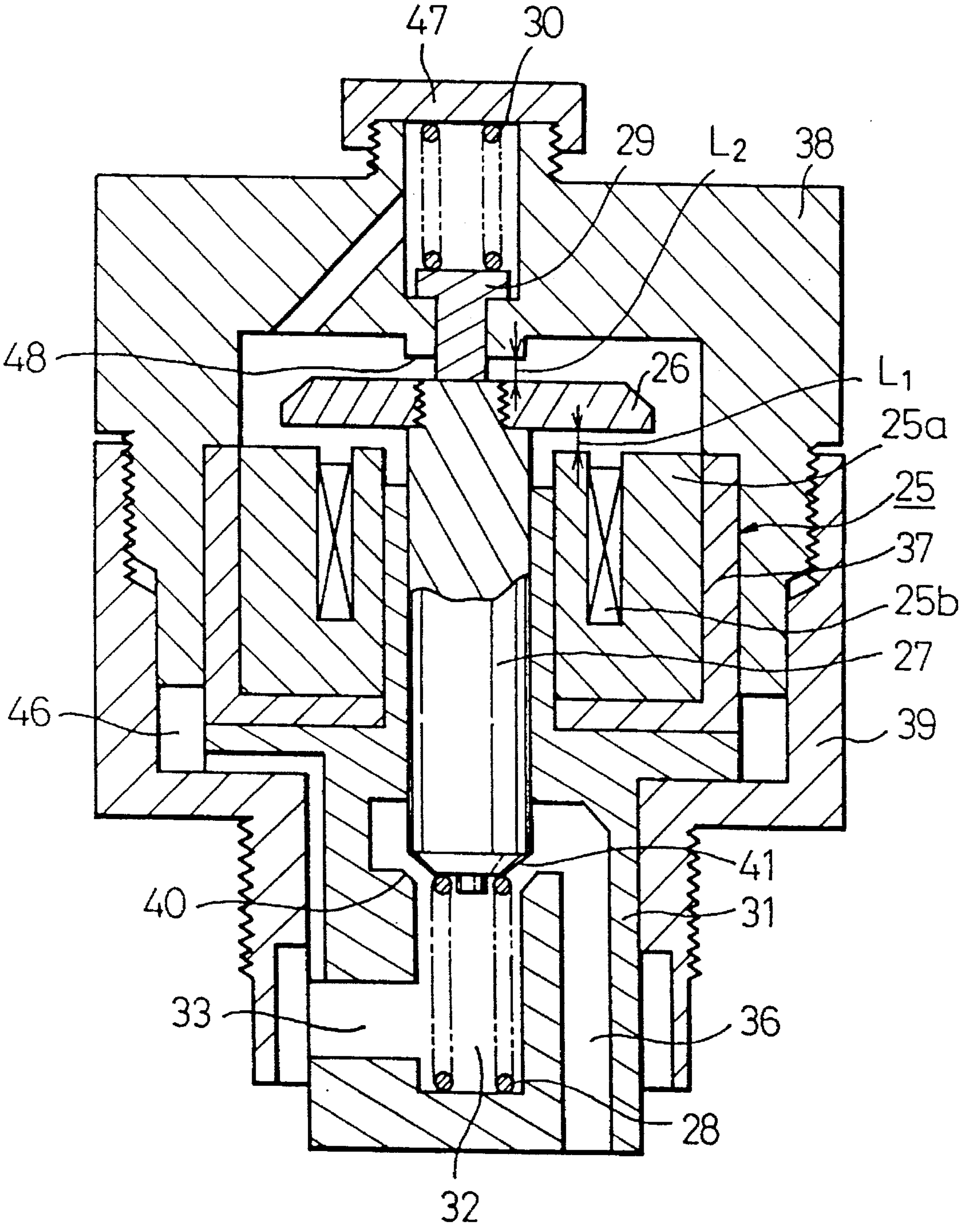
FIG. 2 is a sectional view of a solenoid valve in a first embodiment according to the present invention.

Referring to FIG. 2, the needle valve 27 is fitted vertically slidably, as viewed in FIG. 2, in a central hole formed in the valve body 31 with its tapered tip facing the seat surface 40 having a conical shape. The needle valve 27 is biased upward, as viewed in FIG. 2, with a compression coil spring 28 placed within the spring chamber 32. A plate-like armature 26 is fixed to the upper end of the needle valve 27. The magnetic core **25*a* and the coil 25*b* of the electromagnet 25 are held on a nonmagnetic stator housing 37 put on a cylindrical wall of the valve body 31 through which the needle valve 27 is extended. When the coil 25*b* is not energized, the armature 26 is positioned with a small gap between the lower surface thereof and the upper end of the magnetic core 25*a* of the electromagnet 25. The space containing the armature 26 communicates with the low-pressure chamber 18 by means of a pressure equalizing passage, not shown, so that the same pressure as that of the low-pressure chamber 18 prevails within the space. The upper end of the needle valve 27 penetrating the armature 26 is in contact with the lower end of a stopper rod 29 projecting downward from the lower surface of the upper wall of the upper housing 38. The T-shaped head of the stopper rod 29 is positioned in a spring chamber formed in the upper wall of the upper housing 38, and a compression coil spring 30 is placed in the spring chamber so as to be compressed between a cap 47 closing the spring chamber, and the T-shaped head of the stopper rod 29 to bias the stopper rod 29** downward.

In a state shown in FIG. 2, in which the coil **25*b* of the electromagnet 25 is not energized and the pressure of the fluid in the flow passages 23, 33 and 36 is the same as that in the low-pressure chamber 18, for example, 5 atm, the interval $L_1$ between the upper end of the magnetic core 25*a* and the lower surface of the armature 26 is 0.3 mm, the interval $L_2$ between the upper surface of the armature 26 and the lower end of a boss 48 formed in the inner surface of the upper wall of the upper housing 38 is 0.2 mm, the preload on the compression coil spring 28 is 5 kg, and the preload on the compression coil spring 30** is 11 kg.

Figure 3:
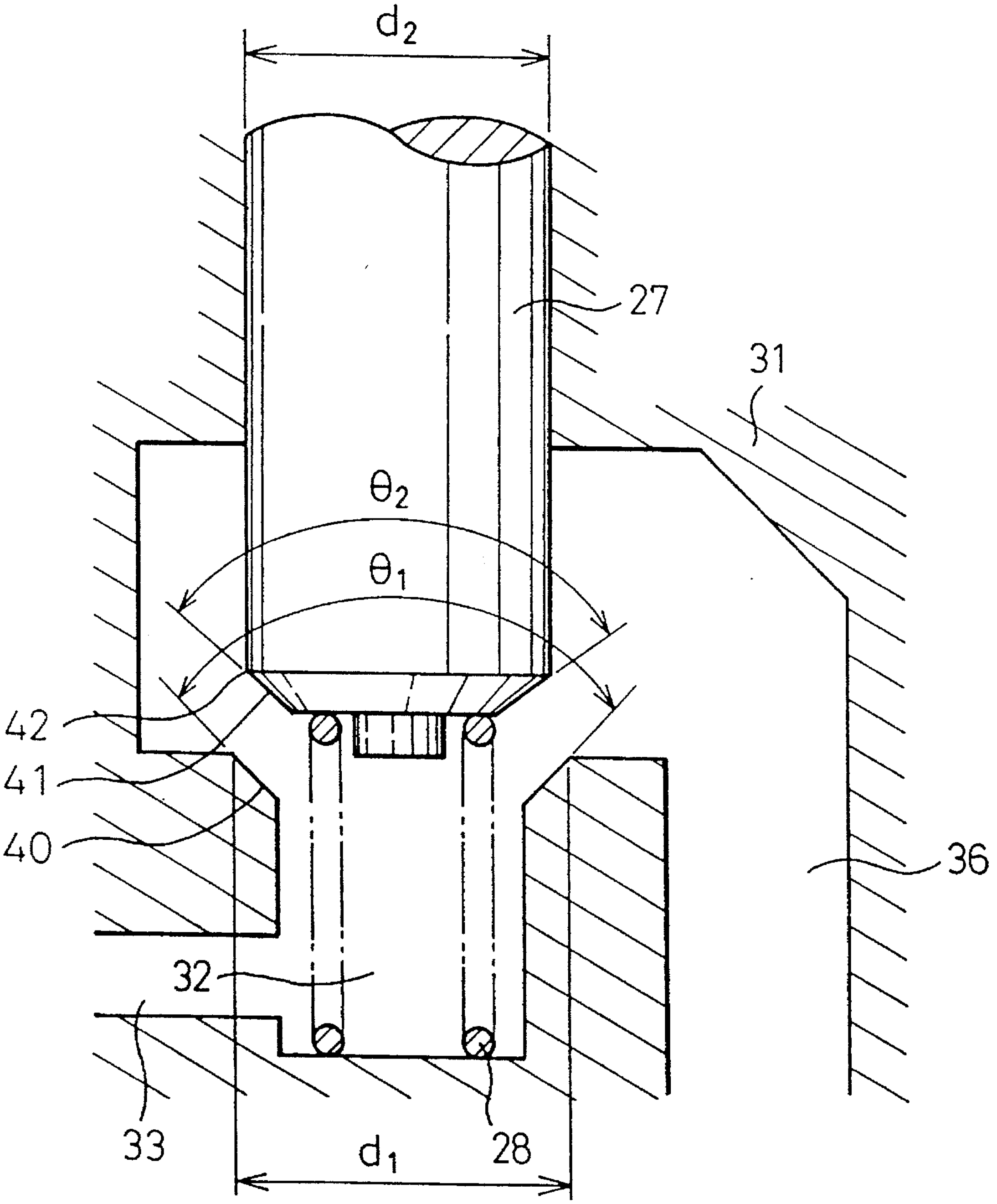
FIG. 3 is an enlarged, fragmentary sectional view of the solenoid valve of FIG. 2, showing the point of a needle valve and the associated portions of the solenoid valve.

Referring to FIG. 3 showing the shape of the tip of the needle valve 27 in detail, the seat surface 40 is a portion of a circular cone having an apex angle $\theta_1$ of 119° and has an upper end, i.e., a larger end, having a diameter d of 8.2 mm, and the needle valve 27 has a diameter d of 8.0 mm and a tapered sealing face 41 having the shape of a portion of a circular cone having an apex angle $\theta_2$ of 120°. When the needle valve 27 rests on the seat surface 40, the upper edge 42 of the sealing face 41 of the needle valve 27 is in close contact with the seat surface 40 to disconnect the flow passages 33 and 36 from each other. The pressure of the fuel in the flow passage 36 acts radially on the needle valve 27 when the needle valve 27 rests on the seat surface 40 and hence the movement of the needle valve 27 is not affected by the pressure of the fuel in the flow passage 36.

Figure 4:
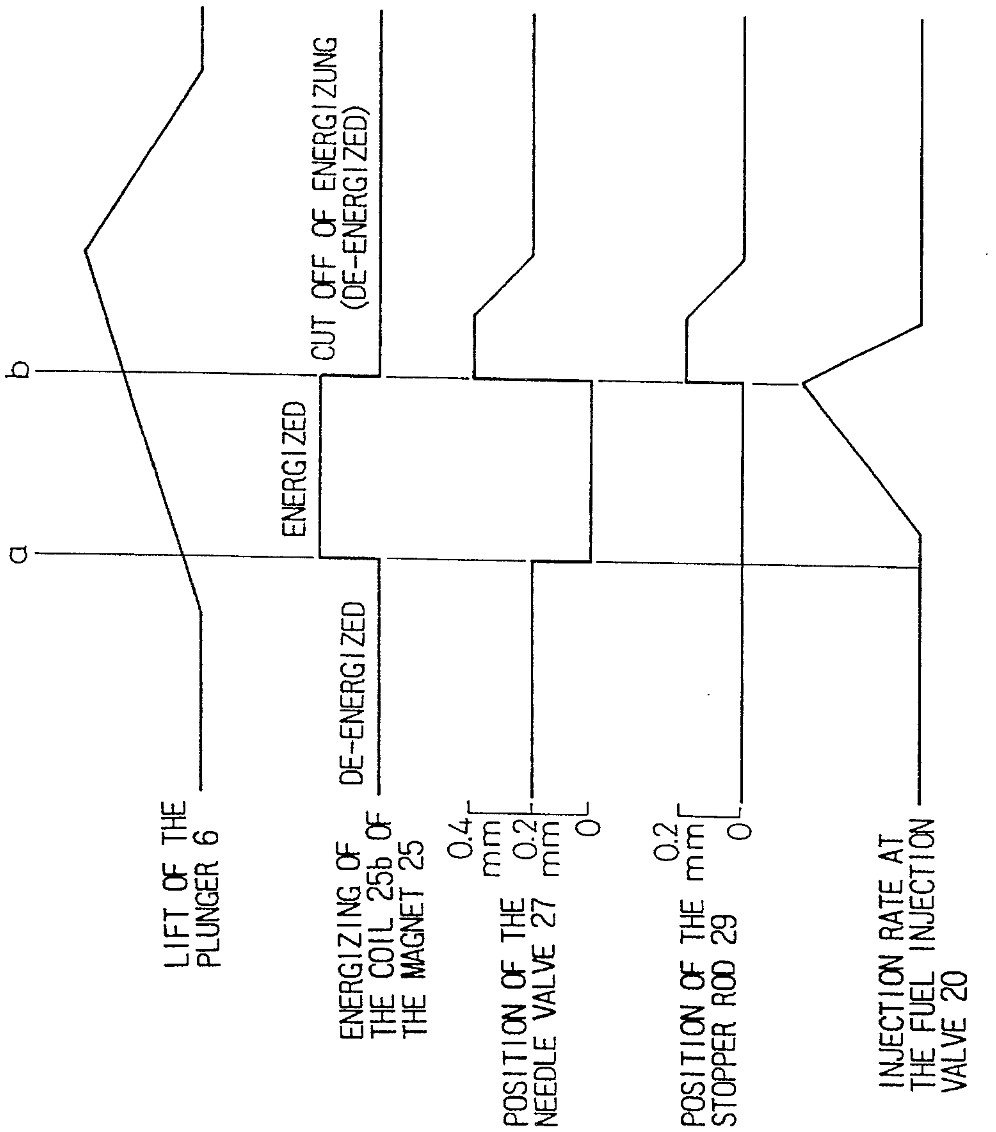
FIG. 4 is a time chart of assistance in explaining the operation of the solenoid valve of FIG. 2.

The operation of the solenoid valve thus constructed will be described hereinafter with reference to FIG. 4.

Figure 5:
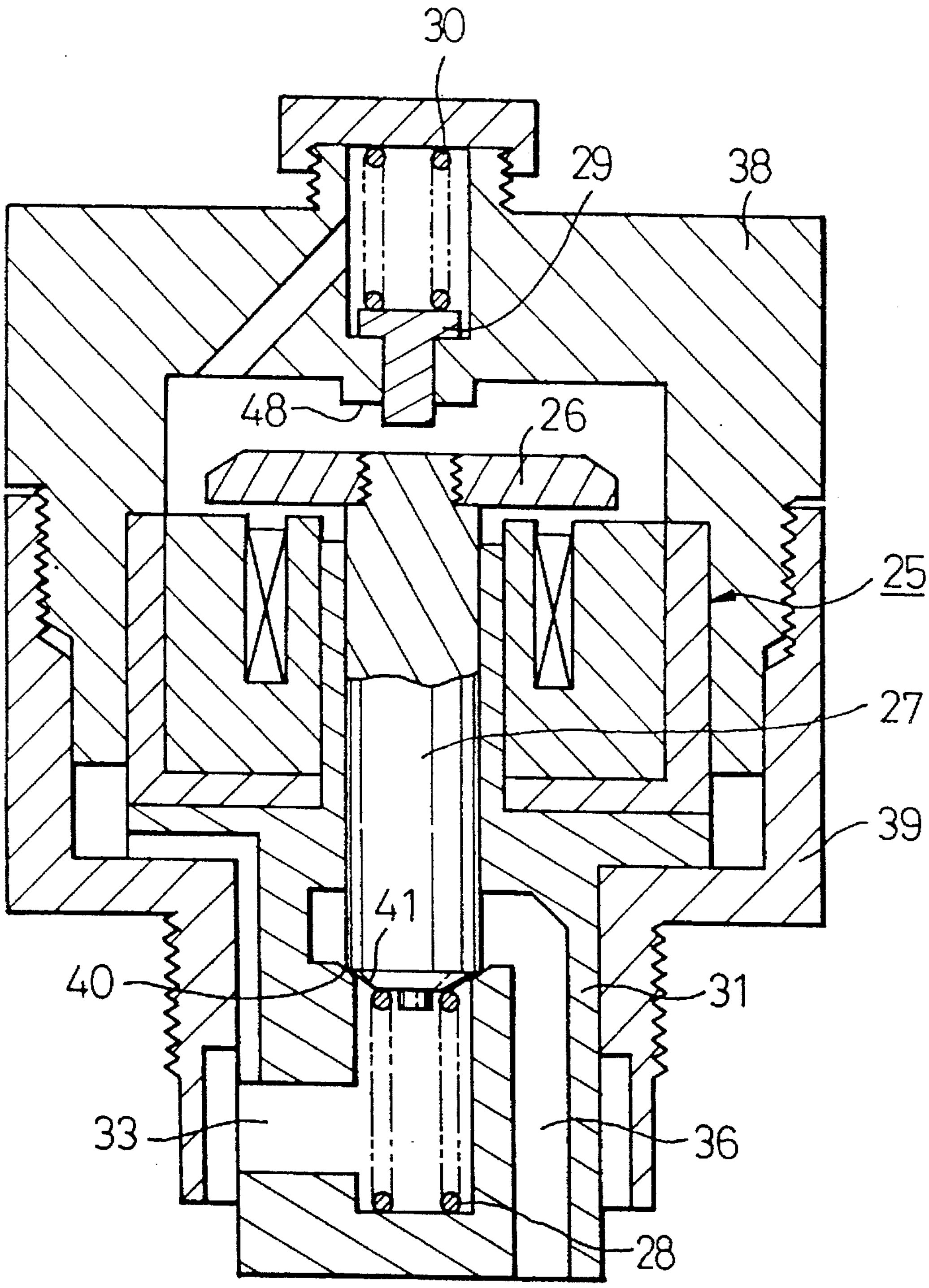
FIG. 5 is a sectional view of assistance in explaining the operation of the solenoid valve of FIG. 2.

Supply of current to the coil **25*b* of the electromagnet 25 is started at a predetermined moment (point a in FIG. 4) after the start of advancement, namely, rightward movement as viewed in FIG. 1, of the plunger 6. Since the interval $L_1$ of 0.3 mm between the magnetic core 25*a* of the electromagnet 25 and the armature 26 is small enough for the magnetic force generated by the electromagnet 25 to act effectively on the armature 26, the armature 26 is attracted without fail toward the electromagnet 25. Consequently, the lift of the needle valve 27 decreases to 0 mm, i.e., the sealing face 41 of the needle valve 27 comes into close contact with the seat surface 40, to disconnect the flow passages 33 and 36 from each other as shown in FIG. 5. In this state, the interval $L_1$ is 0.1 mm. As the plunger 6 advances further, the pressure of the fuel within the pressure chamber 15 increases, and the high-pressure fuel is supplied through the distribution passage 21 to the fuel injection valve 20. Upon the increase of the pressure of the high-pressure fuel beyond a predetermined level, the fuel injection valve 20** starts injecting the high-pressure fuel.

Figure 6:
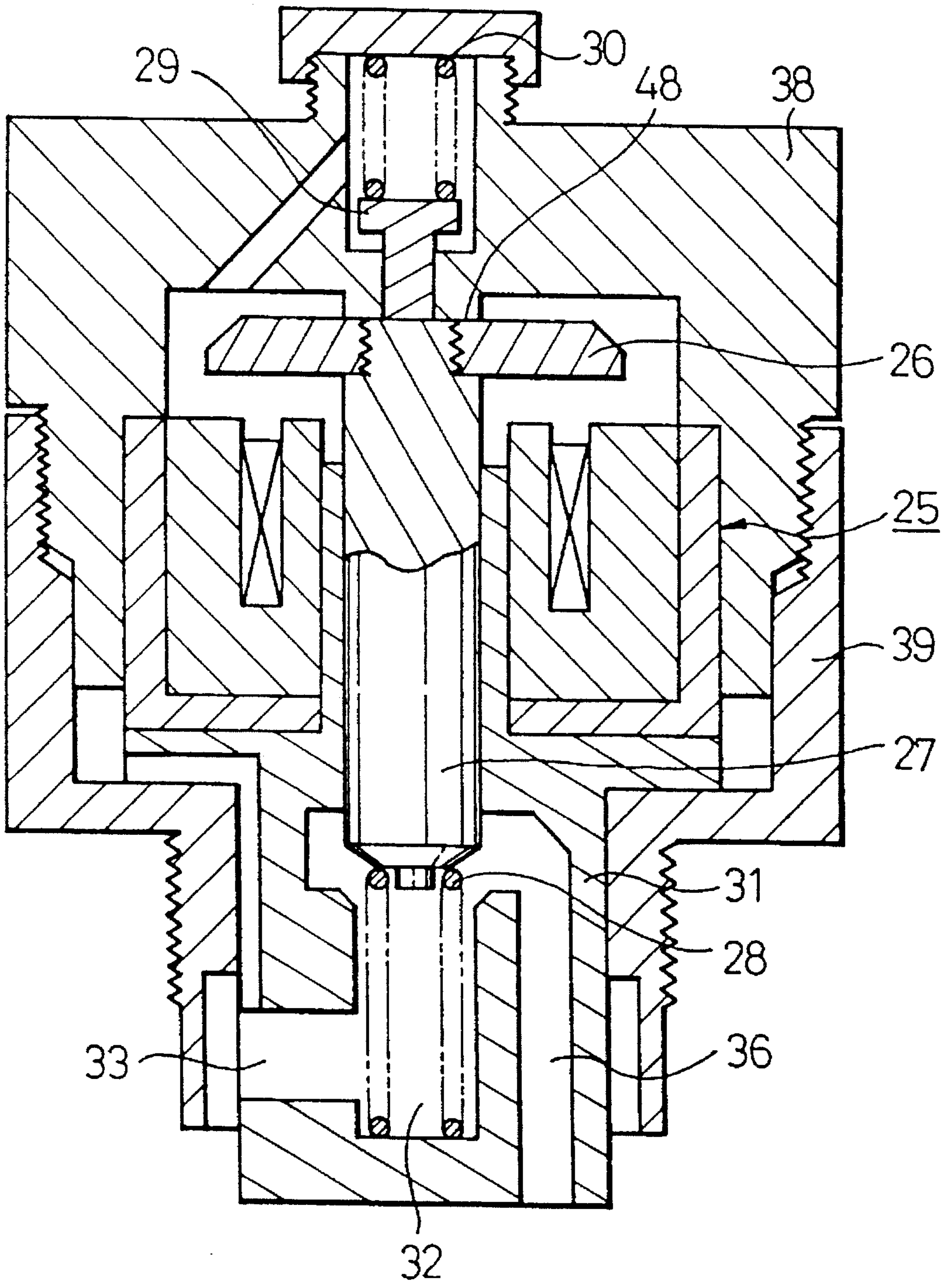
FIG. 6 is a sectional view of assistance in explaining the operation of the solenoid valve of FIG. 2.

After a predetermined, measured quantity of fuel has been injected, the supply of current to the coil 25*b* of the electromagnet 25 is stopped at a point b (FIG. 4), and then the needle valve 27 is raised by the resilience of the compression coil spring 28 to enable the flow passage 33 and 36 to communicate with each other by means of the pressure chamber 32. Then, the high-pressure fuel flows through the flow passage 36 into the spring chamber 32 to urge the needle valve 27 upward and, consequently, the needle valve 27 is moved further upward to move the stopper rod 29 upward against the resilience of the compression coil spring 30 after the upper end of the needle valve 27 has been brought into contact with the stopper rod 29 until the upper surface of the armature 26 comes into contact with the lower surface of the boss 48 formed on the inner surface of the upper wall of the upper housing 38 as shown in FIG. 6. In this state, the lift of the needle valve 27 is 0.4 mm and a sufficiently large gap is secured between the seat surface 40 and the sealing face 41 of the needle valve 27 to spill the high-pressure fuel quickly. Consequently, the pressure of the fuel in the pressure chamber 15 drops rapidly to cut the fuel injection by the fuel injection valve 20 suddenly.

As the pressure of the fuel in the flow passages 33 and 36 decreases, the stopper rod 29 is moved downward by the resilience of the compression coil spring 30 to push down the armature 26 to the position, shown in FIG. 2, where the armature 26 is to be located before starting the fuel injection cycle.

Since the armature is positioned very near to the electromagnet 25 before the start of the fuel injection cycle in which the pressure of the fuel in the flow passages is on a low level, the electromagnet is able to attract the armature 26 surely when energized to secure the reliable flow passage closing action of the needle valve 27, even if the capacity of the electromagnet 25 is comparatively small. When the electromagnet 25 is demagnetized to release the armature 26, the movement of the needle valve 27 away from the seat surface 40 caused by the compression spring 28 is assisted by the pressure of the fuel so that the needle valve 27 rises raising the stopper rod 29 and separated sufficiently from the seat surface 40. Accordingly, the injection of the fuel can be sharply cut.

The compression coil springs 28 and 30 may be substituted by elastic rubber members.

Second Embodiment

Figure 7:
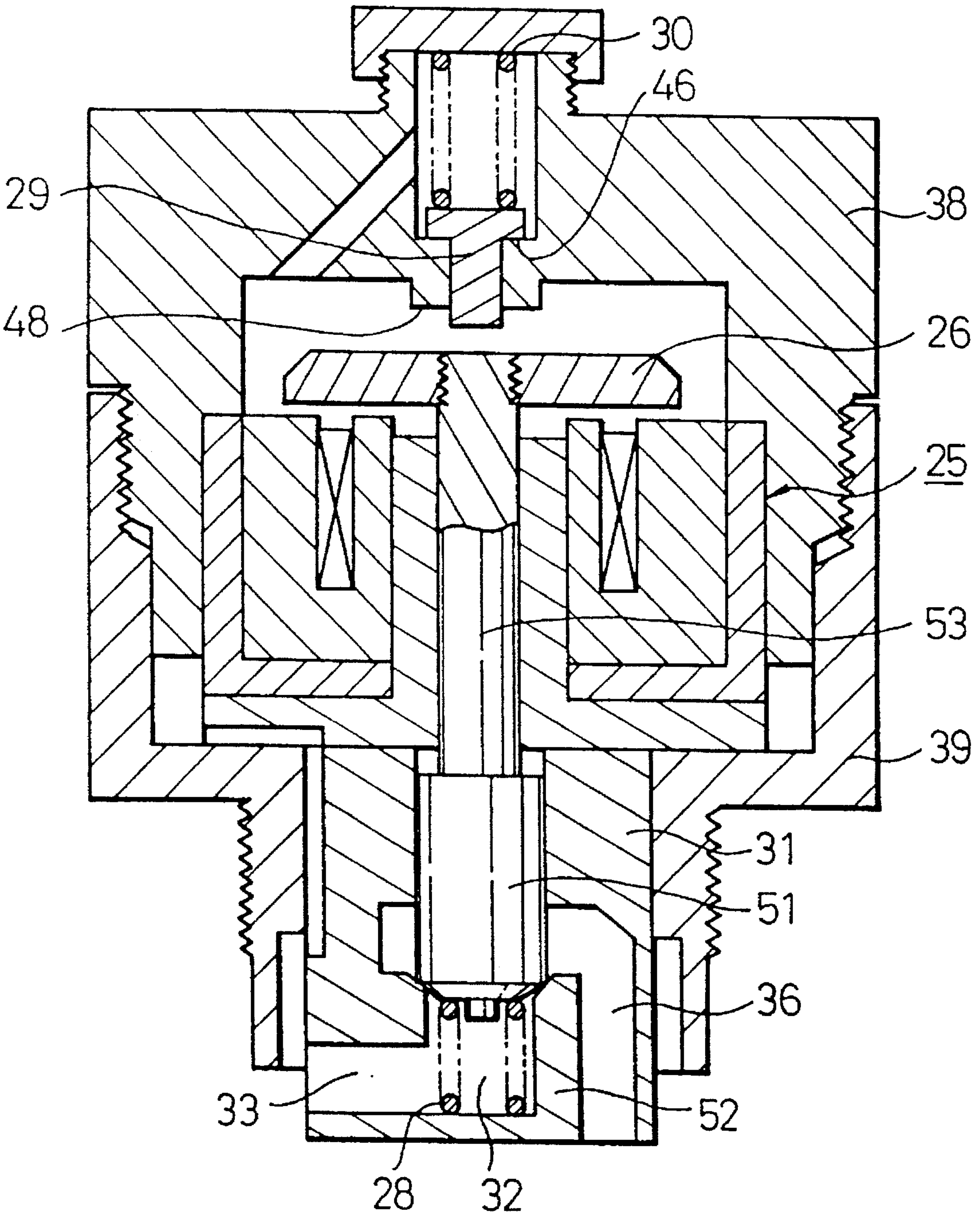
FIG. 7 is a sectional view of the solenoid valve in a second embodiment according to the present invention.

Referring to FIG. 7, a solenoid valve in a second embodiment according to the present invention is provided with a needle valve 51, a stem of which is smaller than that of the needle valve 27 of the first embodiment. A push rod 53 having a comparatively small diameter is fitted axially slidably in the axial, central hole of an electromagnet 25 with its lower end in contact with the upper end of the needle valve 51, and an armature 26 is attached to the upper end of the push rod 53. When energized, the electromagnet 25 attracts the armature 26 to push the needle valve 51 down by the push rod 53 in order that the flow passages 33 and 36 are disconnected from each other as shown in FIG. 7. Since the total mass of the needle valve 27 and the push rod 53 is smaller than the mass of the needle valve 27 of the first embodiment, the response of the solenoid valve in the second embodiment for opening and closing operations is faster than that of the solenoid valve in the first embodiment.

Third Embodiment

Figure 8:
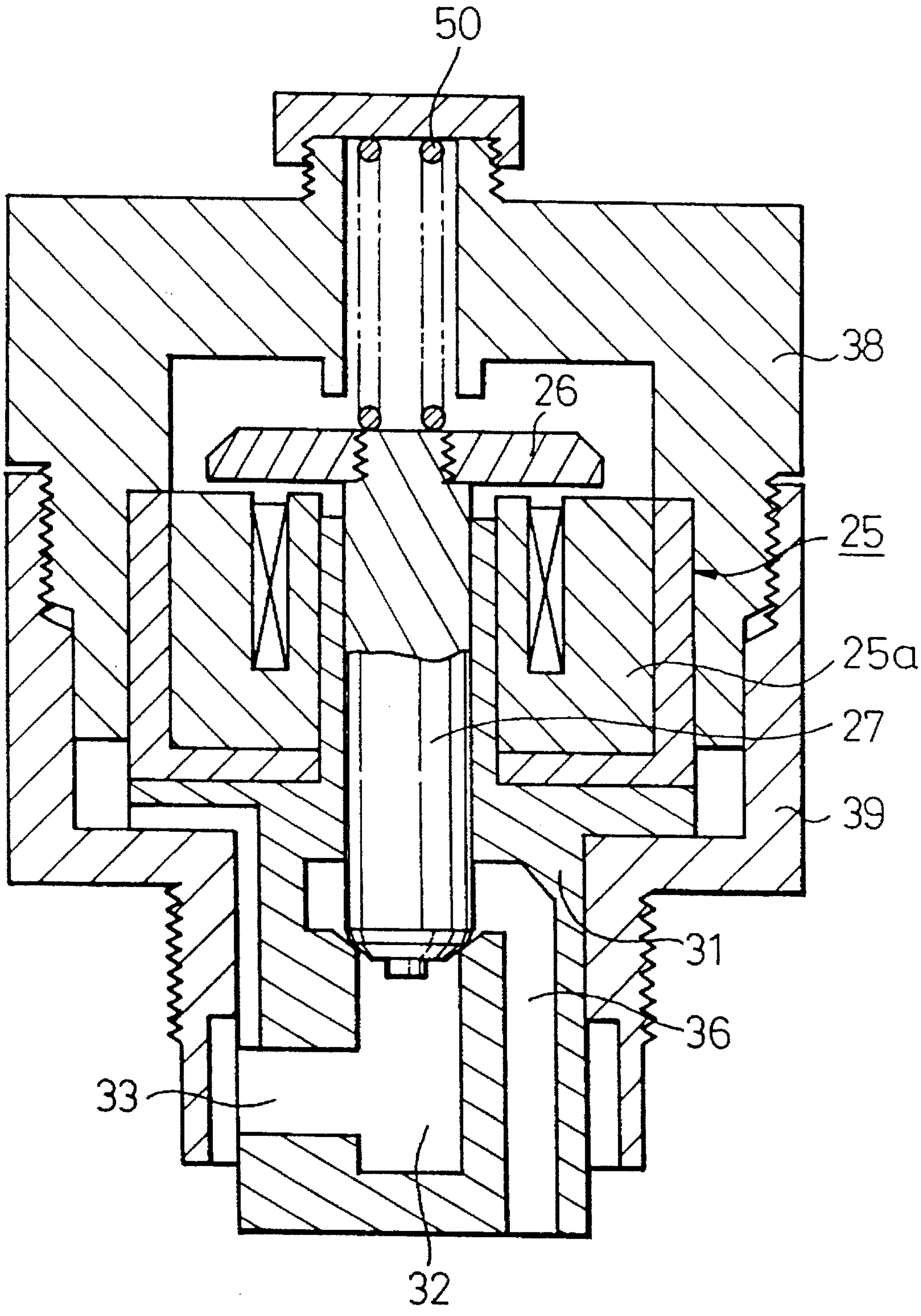
FIG. 8 is a sectional view of a solenoid valve in a third embodiment according to the present invention.
Figure 9:
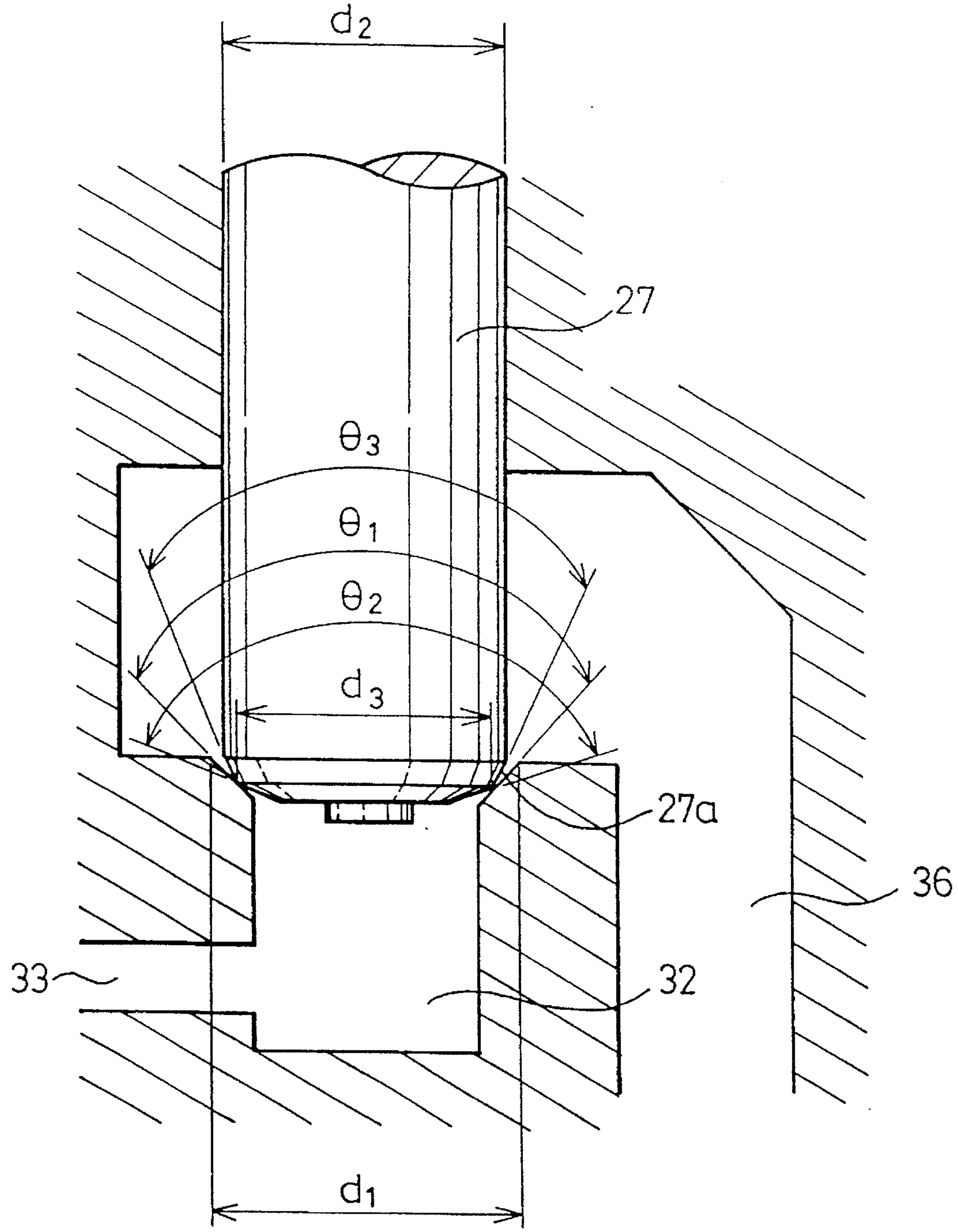
FIG. 9 is an enlarged, fragmentary view of the solenoid valve of FIG. 8, showing the tip of a needle valve and the associated portion of the solenoid valve.

Referring to FIG. 8, a solenoid valve in a third embodiment according to the present invention is not provided with any means like the compression coil springs 28 of the foregoing embodiments in a chamber 32 corresponding to the spring chambers 32 of the foregoing embodiments. This solenoid valve, having a tip formed in a shape as shown in FIG. 9, employs a high pressure fluid acting upon a valve sealing face of a needle valve 27 as the first biasing means. As shown in FIG. 9, the sealing face of the tip of the needle valve 27 consists of an upper conical face 27*a*, which is a portion of a circular cone having an apex angle of $\theta_3$ smaller than the apex angle $\theta_1$ of a circular cone forming a seat surface, and a lower conical face, which is a portion of a circular cone having an apex angle of $\theta_2$. When a high pressure P of the fuel acts on the upper conical face 27*a* while the needle valve 27 is seated on the seat surface, an upward force of $\pi\cdot(d_2^2-d_3^2)\cdot P/4$, where $d_2$ is the diameter of the upper end of the upper conical face 27*a* equal to the diameter of the needle valve 27, and $d_3$ is the diameter of the lower end of the upper conical face 27*a*, acts on the needle valve 27, so that the needle valve 27 is moved upward by this force when the electromagnet 25 is demagnetized.

Since the needle valve 27 is moved away from the seat surface by the action of the high-pressure fuel, the needle valve 27 can be biased downward directly by a compression coil spring 50 to locate an armature 26 in a range near the magnetic core 25*a* of the electromagnet 25 before starting the fuel injection cycle as shown in FIG. 8. Thus, this solenoid valve needs less component parts than the solenoid valves in the foregoing embodiments and has a simple construction. When the needle valve 27 of the first embodiment is provided with a conical surface like the upper conical surface 27*a* of the needle valve 27 of the third embodiment, the preload on the compression coil spring 28 may be reduced.

Fourth Embodiment

Figure 10:
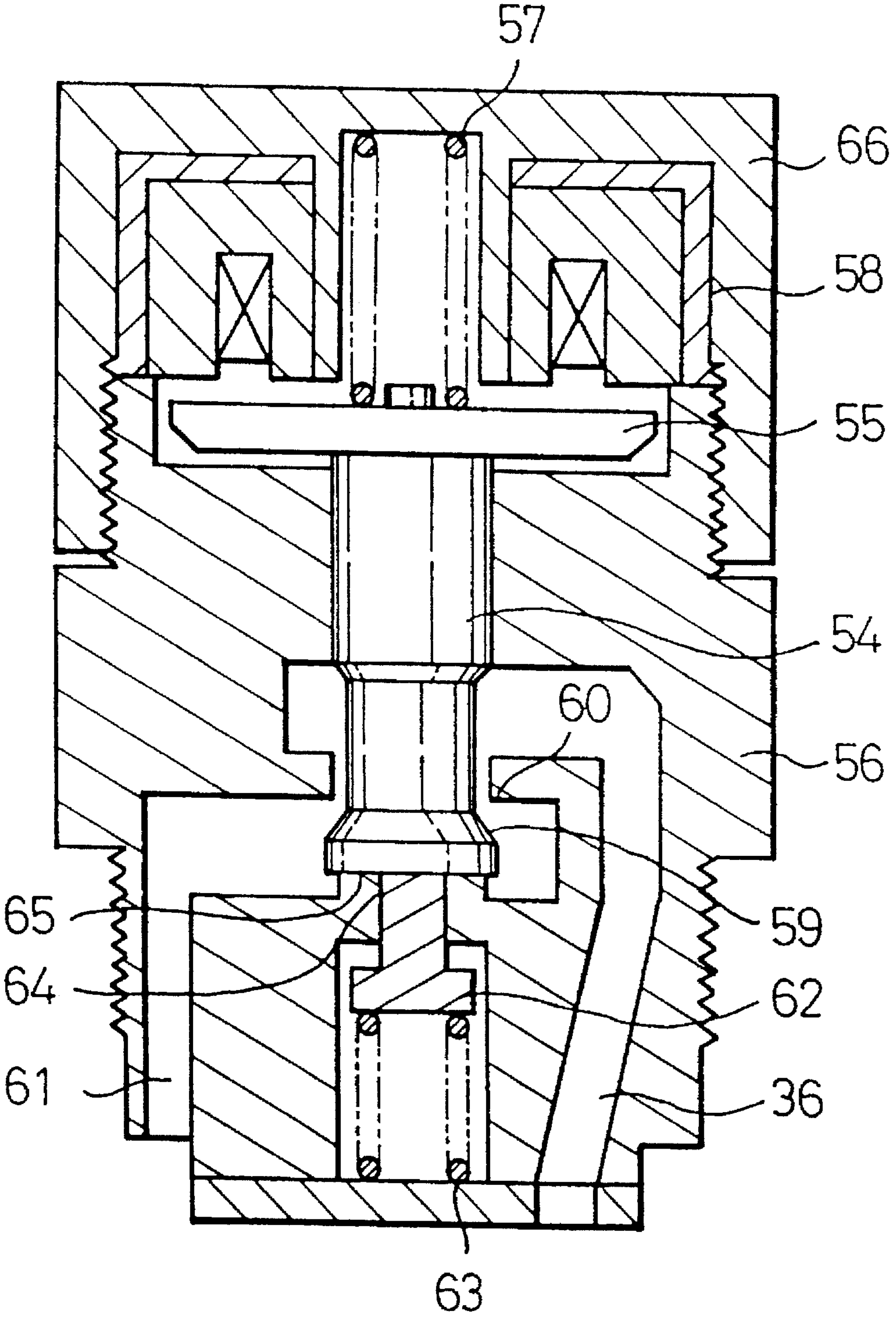
FIG. 10 is a sectional view of a solenoid valve in a fourth embodiment according to the present invention.

Referring to FIG. 10, a solenoid valve in a fourth embodiment according to the present invention is provided with a needle valve 54 for disconnecting a high-pressure flow passage 36 and a low-pressure flow passage 61 extends through a wall on which a seat surface 60 is formed. When the needle valve 54 is raised, a sealing face 59 formed on the circumference of an expanded portion of the needle valve 54 comes into close contact with the seat surface 60 to disconnect the flow passages 36 and 61 from each other.

An electromagnet 58 is disposed above an armature 55 attached to the upper end of the needle valve 54, and mounted on a central boss projecting downward from the inner surface of the upper wall of an upper housing 66. The armature 55 is biased downward together with the needle valve 54 by a compression coil spring 57 placed within the central boss of the upper housing 66. When the electromagnet is magnetized, the armature 55 is, together with the needle valve 54, attracted toward the electromagnet 58, so that the sealing face 59 of the needle valve 54 comes into close contact with the seat surface 60 to disconnect the flow passages 36 and 61 from each other. A stopper rod 62 is placed in a hole formed in a valve body 56 below the needle valve 54 and is biased upward with a compression coil spring 63 so that the upper end thereof is in contact with the lower end of the needle valve 54 positioned within the low-pressure flow passage 61 while the electromagnet 58 is not magnetized.

In a state where the low-pressure fuel prevails within the flow passages 36 and 61, the stopper rod 62 is biased upward to lift the needle valve 54 by a predetermined amount so that the armature 55 is located close to the electromagnet 58. Accordingly, a sufficiently intense magnetic field is applied to the armature 55 and the needle valve 54 can be surely moved to a closed position when the electromagnet 58 is magnetized.

When the electromagnet 58 is demagnetized after the pressure of the fuel prevailing in the high-pressure flow passage 36 has increased to a predetermined level, the needle valve 54 is moved downward by the combined action of the resilience of the compression coil spring 57 and the pressure of the fuel to connect the flow passages 36 and 61. The needle valve 54 is thus moves downward, depressing the stopper rod 62, until the lower end of the needle valve 54 comes into contact with a boss 65 formed on the inner surface of the valve body 56 as shown in FIG. 10, so that a sufficiently wide space is formed between the sealing face 59 and the seat surface 60. Consequently, the injection of the fuel can suddenly be cut.

Fifth Embodiment

Figure 11:
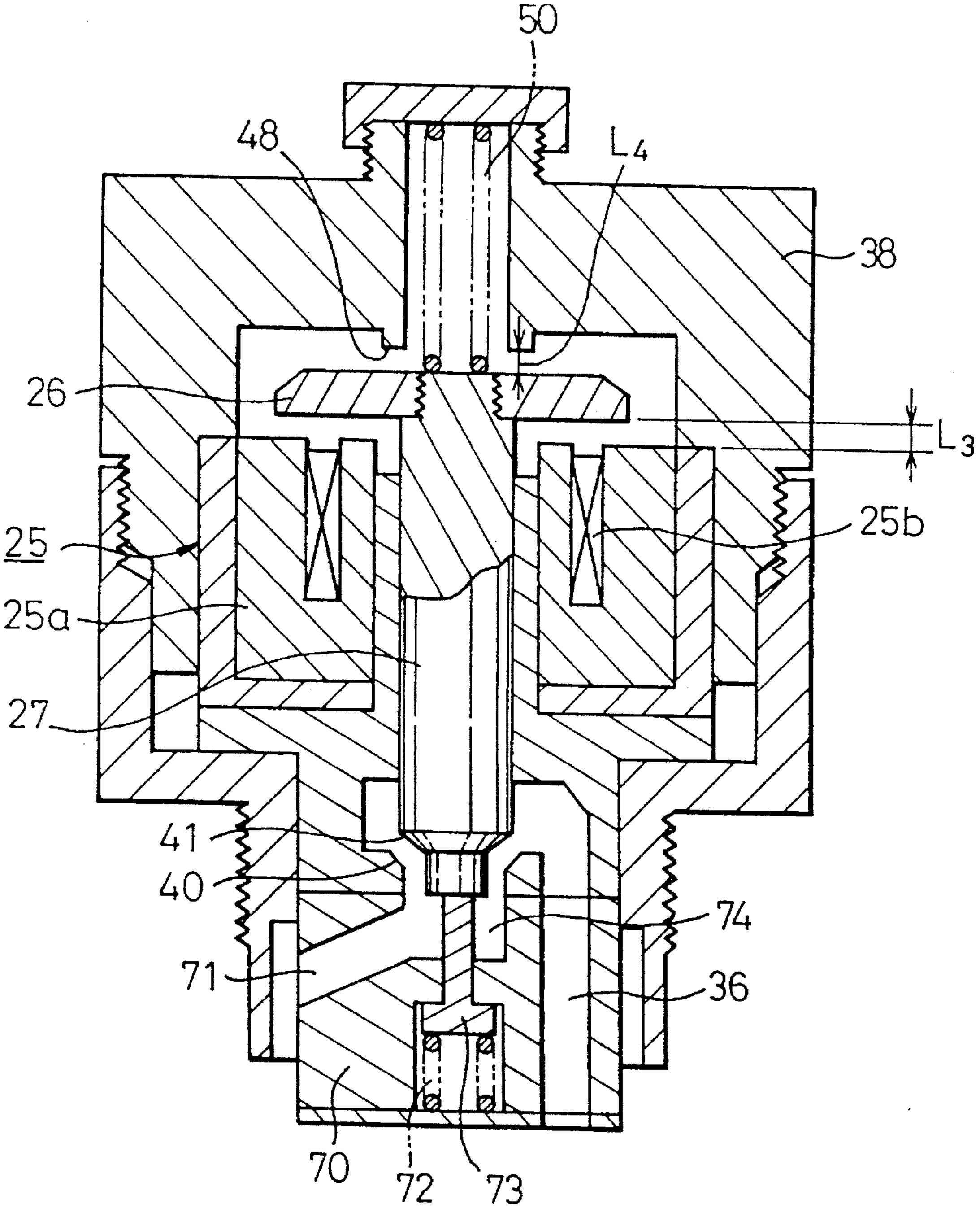
FIG. 11 is a sectional view of a solenoid valve in a fifth embodiment according to the present invention.

Referring to FIG. 11, a solenoid valve in a fifth embodiment according to the present invention is provided with a needle valve 27, for disconnecting flow passages 36 and 71, biased in the closing direction with a compression coil spring 50. The preload on the compression coil spring 50 is, for example, 6 kg. A stopper rod 73 is placed in a distance piece 70 disposed below the needle valve 27 and biased upward with a compression coil spring 72 so that the upper end of the same is in contact with the tip of the needle valve 27. The preload on the compression coil spring 72 is, for example, 11 kg. The compression coil spring 72 biases the needle valve 27 through the stopper rod 73 in the opening direction. When the lift of the needle valve 27 increases beyond 0.2 mm, the needle valve 27 is separated from the stopper rod 73 and the biasing force of the compression coil spring 72 does not act on the needle valve 27.

In a state where an electromagnet 25 is not magnetized and the pressure of the fuel prevailing in the flow passages 36 and 71 is equal to that of the fuel prevailing within a low-pressure chamber 18, for example, 5 atm, the interval $L_3$ between the magnetic core 25*a* of the electromagnet 25 and the lower surface of an armature 26 attached to the upper end of the needle valve 27 is 0.3 mm, and the interval $L_4$ between the upper surface of the armature 26 and a boss 48 formed on the inner surface of the upper wall of an upper housing 38 is 0.2 mm. When the coil 25*b* of the electromagnet 25 is energized, the armature 26 is attracted toward the electromagnet 25 to move the needle valve 27 downward so that the sealing face 41 of the needle valve 27 comes into close contact with a seat surface 40 to disconnect the flow passages 36 and 71 from each other. In this state, the interval $L_3$ is 0.1 mm.

Upon the de-energization of the coil 25*b* of the electromagnet 25, the needle valve 27 is raised by the resilience of the compression coil spring 72 to connect the flow passages 36 and 71. Consequently, the high-pressure fuel flows into a flow passage 74 under the needle valve 27 to urge the needle valve 27 upward against the resilience of the compression coil spring 50 until the armature 26 comes into contact with a boss 48 formed in the inner surface of the upper housing 38. In this state, the lift of the needle valve 27 is 0.4 mm.

The solenoid valve in the fifth embodiment is advantageous over the solenoid valve in the first embodiment in the following respects.

Whereas the preload on the compression coil spring 28 of the solenoid valve in the first embodiment can be adjusted by means of shims or the like, not shown, so that the needle valve 27 is seated on the seat surface 40 when a current Is (A) is supplied to the coil 25*b* of the electromagnet 25, the preload on the compression coil spring 30 of the solenoid valve in the first embodiment cannot be adjusted in such a manner.

Meanwhile, in the fifth embodiment, both the preload on the compression coil spring 50 and the preload on the compression coil spring 72 can be adjusted to appropriate values by first adjusting the preload on the compression coil spring 72 in a state where the compression coil spring 50 is removed so that the needle valve 27 is seated on the seat surface 40 when a current $I_2$ (A) is supplied to the coil 25*b* of the electromagnet 25, and secondly adjusting the preload on the compression coil spring 50 so that the needle valve 27 is seated on the seat surface 40 when a current $I_3$ (A) is supplied to the coil 25*b* of the electromagnet 25.

Sixth Embodiment

Figure 12:
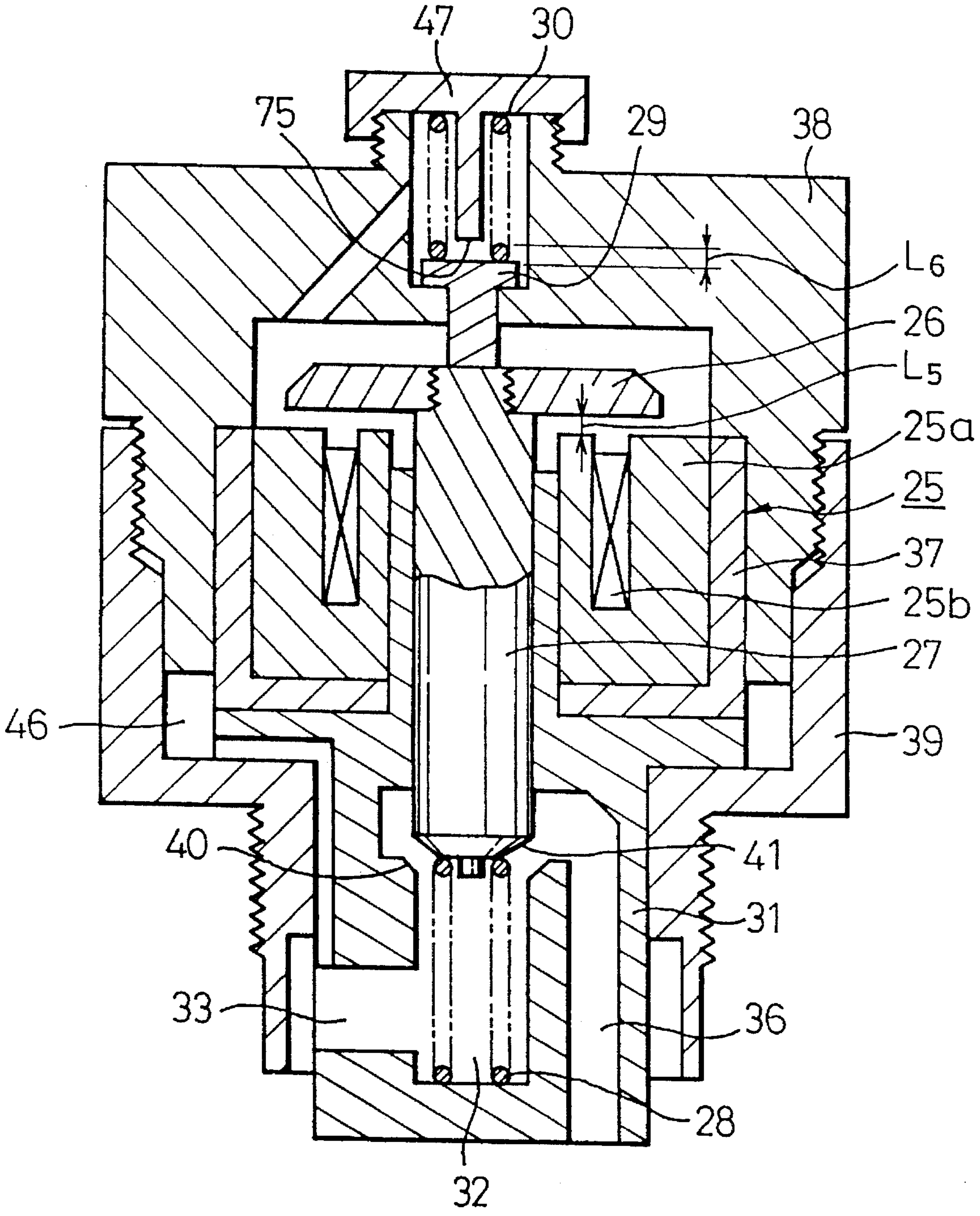
FIG. 12 is a sectional view of a solenoid valve in a sixth embodiment according to the present invention.
Figure 13:
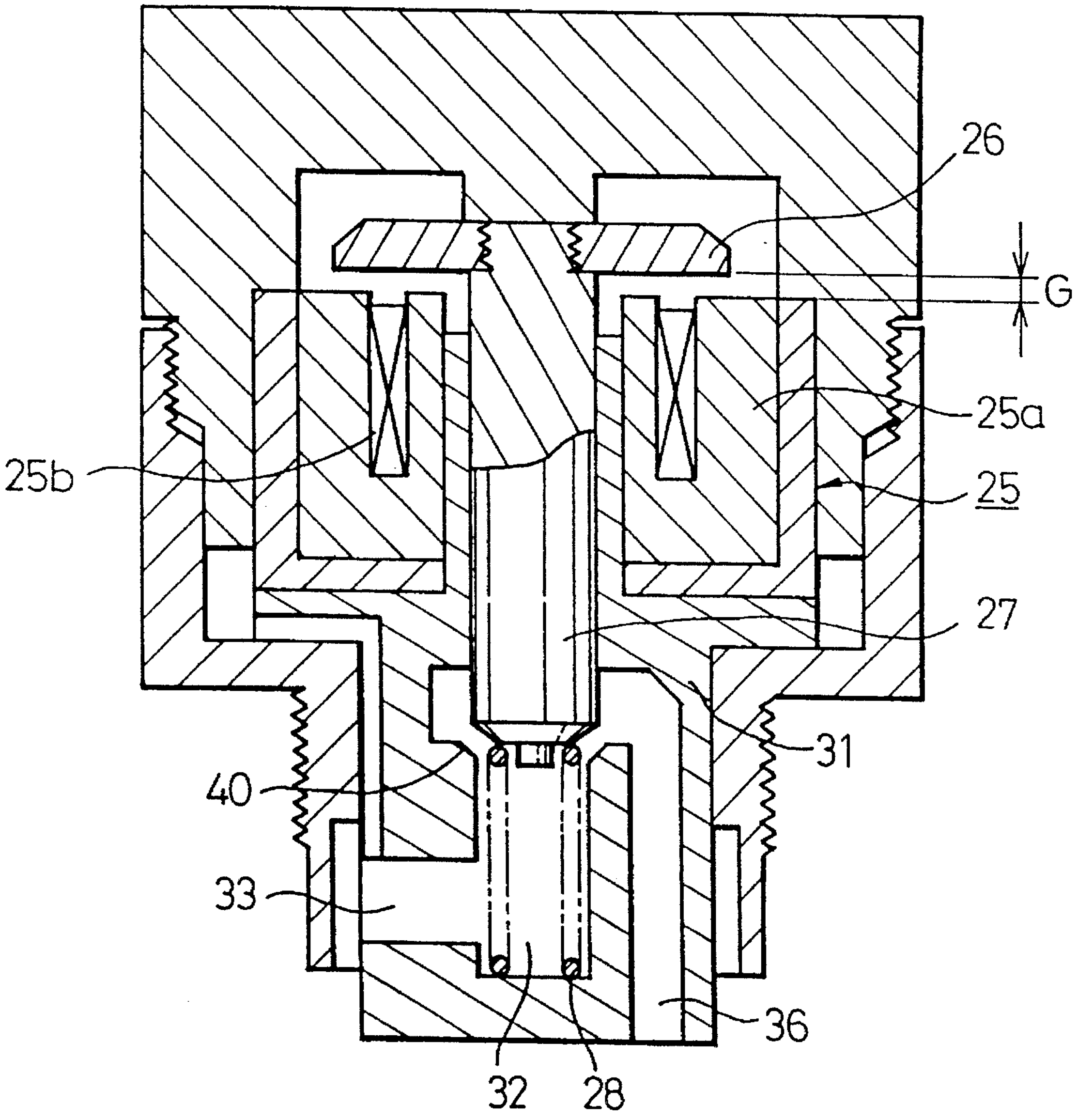
Fig.13 (PRIOR ART)
FIG. 13 is a sectional view of a known solenoid valve.

Referring to FIG. 12, a solenoid valve in a sixth embodiment according to the present invention is provided with a cap 47 having a projection 75 projecting from the inner surface of the upper wall thereof. The function of the projection 75 is equivalent to the boss 48 formed on the inner surface of the upper wall of the upper housing 38 of the solenoid valve in the first embodiment.

In a state where an electromagnet 25 is not magnetized and the pressure of the fuel prevailing in flow passages 23, 33 and 36 is equal to the pressure (5 atm) of the fuel prevailing in a low-pressure chamber 18, the interval $L_5$ between the upper end of the magnetic core 25*a* of the electromagnet 25 and the lower surface of an armature 26 attached to the upper end of a needle valve 47 is 0.3 mm and the interval $L_6$ between the extremity of the projection 75 of the cap 47 and a stopper rod 29 is 0.2 mm. In the sixth embodiment, the preload on a compression coil spring 28 is 5 kg and that on a compression coil spring 30 is 11 kg.

When the coil 25*b* of the electromagnet 25 is energized, the armature 26 is attracted toward the electromagnet 25 to disconnect flow passages 33 and 36 from each other by bringing a sealing face 41 formed on the lower end of the needle valve 47 into close contact with a seat surface 40. In this state, the interval $L_5$ is 0.1 mm.

When the coil 25b of the electromagnet 25 is de-energized, the needle valve 27 is raised by the resilience of the compression coil spring 28 to connect the flow passages 33 and 36 and, consequently, the high-pressure fuel flows into a spring chamber 32. The high-pressure fuel raises the needle valve 27 further against the resilience of the compression coil spring 30 after the needle valve 27 has come into contact with the stopper rod 29 until the stopper rod 29 is stopped by the projection 75 of the cap 47.

The solenoid valve in the sixth embodiment is advantageous over the solenoid valve in the first embodiment in the following respect.

In the first embodiment, the stopper rod 29 separates from the needle valve 27 by inertia and moves further upward, as viewed in FIG. 2 after the needle valve 27 has been stopped by the boss 48 formed on the inner surface of the upper wall of the upper housing 38, and then the stopper rod 29 is moved downward by the resilience of the compression coil spring 30 and pushes the needle valve 27 downward. Consequently, if the pressure of the fuel in the spring chamber 32 is not sufficiently high, there is the possibility that the lift of the needle valve 27 decreases for a moment. Meanwhile, in the sixth embodiment, the stopper rod 29 is stopped by the projection 75 of the cap 47 when the needle valve 27 is raised at the maximum lift and hence the stopper 29 is unable to separate from the needle valve 27. Thus, the needle valve 27 can be secured at the maximum lift.

The solenoid valve of the present invention is not limited in its practical application to use in combination with the face cam type fuel injection pump; the solenoid valve of the present invention is applicable also to use in combination with inner cam type fuel injection pumps, line fuel injection pumps and devices other than fuel injection pumps.

Although the invention has been described in its preferred form with a certain degree of particularity, obviously many changes and variations are possible therein. It is therefore to be understood that the present invention may be practiced otherwise than as specifically described herein without departing from the scope and spirit thereof.

We claim:

1. A solenoid valve for a fuel injection pump comprising:

a valve body defining a bore therein and defining a first passage connected to a high-pressure side of the fuel injection pump and a second passage connected to a low-pressure side of the fuel injection pump, said valve body having a valve seat disposed coaxially with said bore between said first and second passages;

a cylindrical valve element disposed movably within said bore between a closed position wherein said valve element abuts said valve seat, disconnecting said first passage from said second passage, and an open position wherein said valve element is displaced from said valve seat, connecting said first passage to said second passage, said cylindrical valve element having a substantially uniform cylindrical surface extending substantially parallel to an opening direction thereby substantially eliminating a surface upon which a pressure can act to bias said valve element in the opening direction when said valve element is in the closed position;

first biasing means for biasing said cylindrical valve element towards the open position;

an armature disposed on said valve element, said armature being contained in a space communicating with the low-pressure side; and an electromagnet having a coil spaced axially from said armature, said electromagnet urging said armature towards the closed position when said coil is energized.

2. A solenoid valve according to claim 1 further comprising second biasing means for positioning said armature within a predetermined range against a biasing force of said first biasing means when said coil is de-energized.

3. A solenoid valve according to claim 2, further comprising a stopper member disposed between said second biasing means and said valve element, said stopper member cooperating with said second biasing means to position said armature in said predetermined range when said second biasing means acts against said first biasing means when said coil is de-energized.

4. A solenoid valve according to claim 2, further comprising a stopper rod disposed between said second biasing means and said cylindrical valve element, said stopper rod being biased by said second biasing means so as to contact said cylindrical valve element and to remain in contact with said cylindrical valve element when said cylindrical valve element is biased in said opening direction, said stopper rod cooperating with said second biasing means to position said armature in said predetermined range when said second biasing means displaces said stopper rod to a maximum extent.

5. A solenoid valve according to claim 1, wherein said first passage is connectable to a high-pressure side and wherein said second passage is connectable to a low-pressure side such that a high-pressure fluid can flow from said high-pressure side to said low-pressure side when said valve element is in the open position, and wherein said first biasing means includes said high-pressure fluid acting upon said cylindrical valve element when said cylindrical valve element is displaced from said valve seat.

6. A solenoid valve for a fuel injection pump comprising:

a valve body defining a bore therein and defining a first passage connected to a high-pressure side of the fuel injection pump and a second passage connected to a low-pressure side of the fuel injection pump, said valve body having a valve seat disposed coaxially with said bore between said first and second passages;

a cylindrical valve element disposed movably within said bore between a closed position wherein said valve element abuts said valve seat disconnecting said first passage from said second passage and an open position wherein said valve element is displaced from said valve seat connecting said first passage to said second passage, said cylindrical valve element having a substantially uniform cylindrical surface extending substantially parallel to an opening direction thereby substantially eliminating a surface upon which a pressure can act to bias said valve element in the opening direction when said valve element is in the closed position, said valve element contacting said valve seat in the closed position along a contacting interface of said valve seat such that a diameter of said contacting interface is not substantially smaller than a diameter of said cylindrical valve element thereby substantially eliminating a surface upon which a pressure can act to bias said cylindrical valve element in an opening direction when said cylindrical valve element is in the closed position;

first biasing means for biasing said cylindrical valve element towards the open position;

an armature disposed on said valve element; and an electromagnet having a coil spaced axially from said armature, said electromagnet urging said armature towards the closed position when said coil is energized.

7. A solenoid valve according to claim 6 further comprising second biasing means for positioning said armature within a predetermined range against a biasing force of said first biasing means when said coil is de-energized.

8. A solenoid valve according to claim 6, wherein said cylindrical valve element has a valve sealing face having a substantially conical shape and wherein said valve seat also has a substantially conical shape, an apex angle of said conical shape of said valve seat being smaller than an apex angle of said conical shape of said valve sealing face.

9. A solenoid valve according to claim 7, further comprising a stopper member disposed between said second biasing means and said valve element, said stopper member cooperating with said second biasing means to position said armature in said predetermined range when said second biasing means acts against said first biasing means when said coil is de-energized.

10. A solenoid valve according to claim 7, further comprising a stopper rod disposed between said second biasing means and said cylindrical valve element, said stopper rod being biased by said second biasing means so as to contact said cylindrical valve element and to remain in contact with said cylindrical valve element when said cylindrical valve element is biased in said opening direction, said stopper rod cooperating with said second biasing means to position said armature in said predetermined range when said second biasing means displaces said stopper rod to a maximum extent.

11. A solenoid valve according to claim 6, wherein said first passage is connectable to a high-pressure side and wherein said second passage is connectable to a low-pressure side such that a high-pressure fluid can flow from said high-pressure side to said low-pressure side when said valve element is in the open position, and wherein said first biasing means includes said high-pressure fluid acting upon said cylindrical valve element when said cylindrical valve element is displaced from said valve seat.

12. A solenoid valve for a fuel injection pump comprising:

a cylindrical housing having an open end and a substantially closed end, said substantially closed end defining a hole therethrough;

a valve body disposed within said cylindrical housing and coaxially with said hole, said valve body defining a bore therein and defining a first passage connected to a high-pressure side of the fuel injection pump and a second passage connected to a low-pressure side of the fuel injection pump, said valve body having a valve seat disposed coaxially with said bore between said first and second passage, said valve seat has a substantially conical shape;

an electromagnet having a coil wound around said valve body for generating electromotive forces;

a cylindrical valve element having a substantially conically shaped valve sealing face disposed movably within said bore between a closed position wherein said valve element abuts said valve seat disconnecting said first passage from said second passage and an open position wherein said valve element is displaced from said valve seat connecting said first passage to said second passage;

an apex angle of said conical shape of said valve seat being smaller than an apex angle of said conical shape of said valve sealing face thereby substantially eliminating a surface upon which a pressure can act to bias said valve element in an opening direction when said valve element is closed;

an armature disposed in said cylindrical valve element; and a stopper rod slidably mounted in and projectable through said hole to abut said valve element and position said armature in a predetermined position when said electromagnet is de-energized.

13. A solenoid valve according to claim 12 further comprising biasing means for biasing said cylindrical valve element in said opening direction.

14. A solenoid valve according to claim 12, further comprising means for controlling movement of said stopper rod in said opening direction.

15. A solenoid valve according to claim 12, further comprising biasing means for biasing said cylindrical valve element towards said closed position.

* * * * *